United States Patent
Ryu

(10) Patent No.: US 10,645,637 B2
(45) Date of Patent: May 5, 2020

(54) ACCESS POINT CONTROL DEVICE AND METHOD

(71) Applicant: Allied Telesis Holdings K.K., Tokyo (JP)

(72) Inventor: Jaehyuk Ryu, Tokyo (JP)

(73) Assignee: Allied Telesis Holdings K.K., Tokyo (JP)

(*) Notice: Subject to any disclaimer, the term of this patent is extended or adjusted under 35 U.S.C. 154(b) by 0 days.

(21) Appl. No.: 16/102,394

(22) Filed: Aug. 13, 2018

(65) Prior Publication Data

US 2019/0053132 A1  Feb. 14, 2019

(30) Foreign Application Priority Data

Aug. 14, 2017  (JP) .................................. 2017-156376

(51) Int. Cl.
*H04W 48/14*  (2009.01)
*H04W 88/12*  (2009.01)
(Continued)

(52) U.S. Cl.
CPC ........... *H04W 48/14* (2013.01); *H04W 48/20* (2013.01); *H04W 72/085* (2013.01);
(Continued)

(58) Field of Classification Search
CPC ..... H04W 48/14; H04W 76/10; H04W 48/20; H04W 72/085; H04W 88/12; H04W 28/16; H04W 84/12; H04W 84/18
See application file for complete search history.

(56) References Cited

U.S. PATENT DOCUMENTS

2005/0197136 A1* 9/2005 Friday .................. H04W 64/00
455/456.1
2006/0253735 A1 11/2006 Kwak et al.
(Continued)

FOREIGN PATENT DOCUMENTS

JP    2009-232374 A   10/2009
JP    2011120257 A    6/2011
JP    201738299 A     2/2017

*Primary Examiner* — Kibrom T Hailu
(74) *Attorney, Agent, or Firm* — Haynes Beffel & Wolfeld, LLP; Ernest J. Beffel, Jr.; Paul A. Durdik

(57) ABSTRACT

An access point control device controls a plurality of proximal wireless LAN access points arranged in proximity to each other and communicating with a communication terminal in a wireless LAN having an access point group of the proximal wireless LAN access points. The access point control device includes an identification information recording section and a terminal communication instructing section. The identification information recording section records identification information of the proximal wireless LAN access points. The terminal communication instructing section, based on records in the identification information recording section, instructs one or more of the proximal wireless LAN access points to stop communicating with the communication terminal and instructs the proximal wireless LAN access points other than the proximal wireless LAN access points instructed to stop communicating with the communication terminal to communicate with the communication terminal.

14 Claims, 10 Drawing Sheets

(51) Int. Cl.
| | |
|---|---|
| *H04W 72/08* | (2009.01) |
| *H04W 76/10* | (2018.01) |
| *H04W 48/20* | (2009.01) |
| H04W 84/12 | (2009.01) |
| H04W 84/18 | (2009.01) |
| H04W 28/16 | (2009.01) |

(52) U.S. Cl.
CPC ........... *H04W 76/10* (2018.02); *H04W 88/12* (2013.01); *H04W 28/16* (2013.01); *H04W 84/12* (2013.01); *H04W 84/18* (2013.01)

(56) References Cited

U.S. PATENT DOCUMENTS

| | | | | |
|---|---|---|---|---|
| 2009/0175208 | A1* | 7/2009 | Thubert | H04W 28/16 370/312 |
| 2011/0038349 | A1* | 2/2011 | Sun | H04W 36/0016 370/331 |
| 2015/0382291 | A1* | 12/2015 | Helvick | H04W 52/0206 370/311 |
| 2017/0245222 | A1 | 8/2017 | Yamamoto et al. | |
| 2018/0288674 | A1* | 10/2018 | Talukdar | H04W 48/02 |

* cited by examiner

| First Strength Threshold | 95% |
|---|---|
| Second Strength Threshold | 20% |
| First Number Threshold | 3 |
| Second Number Threshold | 3 |
| Third Number Threshold | 5 |
| Difference Threshold | 10% |

Fig. 5

| Receiving End \ Transmitting End | 20A | 20B | 20C | 20D | 20E | 20F | 20G | 20H |
|---|---|---|---|---|---|---|---|---|
| 20A | | 50% | 70% | | 60% | 50% | 70% | |
| 20B | 50% | | | 60% | 40% | 50% | | |
| 20C | 70% | | | 50% | 60% | 50% | | 80% |
| 20D | 60% | 70% | 50% | | 60% | 60% | | |
| 20E | 40% | 60% | 60% | 90% | | 80% | 70% | 80% |
| 20F | 50% | 50% | | 80% | 95% | | 80% | 80% |
| 20G | 50% | | | 70% | 80% | 90% | | 90% |
| 20H | | | | 80% | 80% | 90% | 50% | 50% |

Fig. 6

ACCESS POINT CONTROL DEVICE AND METHOD

CROSS-REFERENCE

This application claims priority to Japan Patent Office Application No. 2017-156376, entitled "ACCESS POINT CONTROL DEVICE AND METHOD", filed on Aug. 14, 2017. The priority application(s) are hereby incorporated by reference herein for all purposes.

BACKGROUND

The present disclosure relates to adjusting the number of wireless LAN (Local Area Network) access points that communicate wirelessly with communication terminals in a wireless LAN.

A wireless LAN (Local Area Network) has conventionally been known to have multiple wireless LAN access points. In such a wireless LAN, areas where radio waves from wireless LAN access points do not penetrate and wireless LAN communications are not available are called "coverage holes" (see Japanese Unexamined Patent Application Publication No. 2017-038299, for example). In order to eliminate such coverage holes, it may be conceivable to increase the number of wireless LAN access points in the wireless LAN.

However, too may wireless LAN access points in the wireless LAN could cause radio wave interference to pose an obstacle to wireless communications.

SUMMARY

Accordingly, the number of wireless LAN access points that communicate wirelessly with communication terminals in a wireless LAN should not be too large or too small.

It is hence an object of the present disclosure to adjust the number of wireless LAN access points that communicate wirelessly with communication terminals in a wireless LAN.

According to the present disclosure, an access point control device that controls a plurality of proximal wireless LAN access points arranged in proximity to each other and communicating with a communication terminal in a wireless LAN having an access point group of the proximal wireless LAN access points, includes: an identification information recording section that records identification information of the proximal wireless LAN access points; and a terminal communication instructing section that, based on records in the identification information recording section, instructs one or more of the proximal wireless LAN access points to stop communicating with the communication terminal and instructs the proximal wireless LAN access points other than the proximal wireless LAN access points instructed to stop communicating with the communication terminal to communicate with the communication terminal.

The thus constructed access point control device controls a plurality of proximal wireless LAN access points arranged in proximity to each other and communicating with a communication terminal in a wireless LAN having an access point group of the proximal wireless LAN access points. An identification information recording section records identification information of the proximal wireless LAN access points. A terminal communication instructing section, based on records in the identification information recording section, instructs one or more of the proximal wireless LAN access points to stop communicating with the communication terminal and instructs the proximal wireless LAN access points other than the proximal wireless LAN access points instructed to stop communicating with the communication terminal to communicate with the communication terminal.

According to the access point control device of the present disclosure, the wireless LAN may conform to IEEE Standard 802.11s, and the proximal wireless LAN access points, regardless of whether or not stop communicating with the communication terminal, may communicate with other wireless LAN access points belonging to the wireless LAN.

According to the access point control device of the present disclosure, one of the proximal wireless LAN access points may receive radio waves with a strength equal to or higher than a first strength threshold from the other proximal wireless LAN access points.

According to the access point control device of the present disclosure, the wireless LAN may have a distal wireless LAN access point not belonging to the access point group, both the proximal wireless LAN access points and the distal wireless LAN access point may be wireless LAN access points, the proximal wireless LAN access points may receive radio waves with a strength equal to or higher than a second strength threshold that is lower than the first strength threshold from a first threshold number or more of the wireless LAN access points, two or more of the proximal wireless LAN access points each may receive radio waves with a strength equal to or higher than the second strength threshold from a common second threshold number or more of the wireless LAN access points, and the difference in the strength of radio waves that the two or more proximal wireless LAN access points each may receive from the common wireless LAN access points is equal to or lower than a predetermined difference threshold for any of the common wireless LAN access points.

According to the access point control device of the present disclosure, the terminal communication instructing section may instruct stand-by proximal wireless LAN access points, which are the proximal wireless LAN access points instructed by the terminal communication instructing section to stop communicating with the communication terminal, to communicate with the communication terminal.

According to the access point control device of the present disclosure, the terminal communication instructing section may instruct the stand-by proximal wireless LAN access points to be active when (1) active proximal wireless LAN access points, which are the proximal wireless LAN access points instructed by the terminal communication instructing section to communicate with the communication terminal, undergo a failure, or (2) the active proximal wireless LAN access points cannot receive radio waves with a strength equal to or higher than the second strength threshold from any one or more of the wireless LAN access points that transmit radio waves with a strength equal to or higher than the second strength threshold received by the active proximal wireless LAN access points, or (3) a third threshold number or more increased of communication terminals communicate with the active proximal wireless LAN access points.

According to the access point control device of the present disclosure, the proximal wireless LAN access points instructed to stop communicating with the communication terminal may acquire channel states in the wireless LAN.

According to the present disclosure, an access point control method of controlling a plurality of proximal wireless LAN access points arranged in proximity to each other and communicating with a communication terminal in a wireless LAN having an access point group of the proximal wireless LAN access points, includes: an identification information recording step that records identification information of the proximal wireless LAN access points; and a terminal communication instructing step that, based on records in the identification information recording step, instructs one or more of the proximal wireless LAN access points to stop communicating with the communication terminal and instructs the proximal wireless LAN access points other than the proximal wireless LAN access points instructed to stop communicating with the communication terminal to communicate with the communication terminal.

Particular aspects of the technology disclosed are described in the claims, specification and drawings.

BRIEF DESCRIPTION OF THE DRAWINGS

FIG. 5 shows a list of thresholds used in another embodiment;

FIG. 6 shows an example of information of the wireless LAN access points 20A to 20H acquired by the controller 40 in another embodiment;

DETAILED DESCRIPTION

Hereinafter, a description will be given of an embodiment of the present disclosure referring to drawings. Example implementations are described to illustrate the technology disclosed, not to limit its scope, which is defined by the claims. Those of ordinary skill in the art will recognize a variety of equivalent variations on the description that follows.

Figure 1:
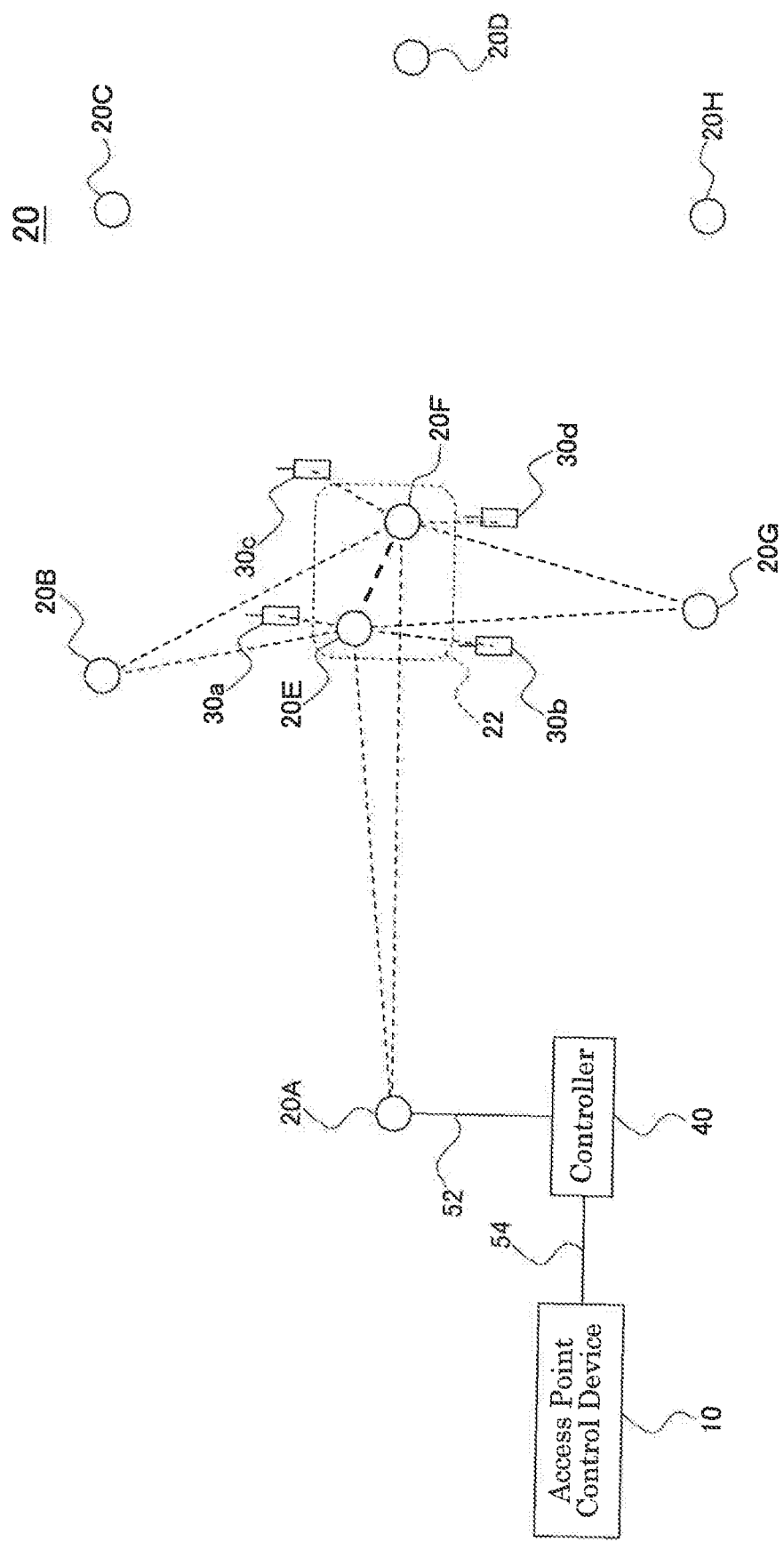
FIG. 1 shows the configuration of a communication system according to an embodiment of the present disclosure.

FIG. 1 shows the configuration of a communication system according to an embodiment of the present disclosure. The communication system according to an embodiment includes a wireless LAN 20, an access point control device 10, a controller 40, LAN cables 52, 54, and communication terminals 30a, 30b, 30c, 30d.

The wireless LAN 20 is a wireless communication LAN (Local Area Network) serving as a mesh network that conforms to IEEE Standard 802.11s. The communication terminals 30a, 30b, 30c, 30d are wireless communication terminals (e.g. personal computers) having no mesh network function that conforms to IEEE Standard 802.11s.

The wireless LAN 20 has wireless LAN access points 20A, 20B, 20C, 20D, 20E, 20F, 20G, 20H having a mesh network function that conforms to IEEE Standard 802.11s. Among these wireless LAN access points, the wireless LAN access points 20E, 20F are called proximal wireless LAN access points, while the other wireless LAN access points (20A, 20B, 20C, 20D, 20G, 20H) are called distal wireless LAN access points. The proximal wireless LAN access points 20E, 20F communicate wirelessly with the communication terminals 30a to 30d. In the example of FIG. 1, the proximal wireless LAN access point 20E communicates wirelessly with the communication terminals 30a, 30b and the proximal wireless LAN access point 20F communicates wirelessly with the communication terminals 30c, 30d. The communication terminals 30a to 30d are arranged in the vicinity of the proximal wireless LAN access points 20E, 20F.

The proximal wireless LAN access points 20E, 20F serve as mesh access points in a mesh network that conforms to IEEE Standard 802.11s to relay wireless communications between other wireless LAN access points (e.g. the wireless LAN access points 20B and 20G). The proximal wireless LAN access points 20E, 20F each have, for example, one 2.4 GHz-band wireless communication interface (used to relay wireless communications between other wireless LAN access points) and two 5 GHz-band wireless communication interfaces (used to communicate wirelessly with the communication terminals 30a to 30d).

It is noted that the wireless LAN access point 20A can directly or indirectly (via another wireless LAN access point) communicate wirelessly with the other wireless LAN access points 20B to 20H. For example, the wireless LAN access point 20A can indirectly (via the wireless LAN access point 20G) communicate wirelessly with the wireless LAN access point 20H.

The wireless LAN 20 has an access point group 22. The access point group 22 consists of the multiple proximal wireless LAN access points 20E, 20F that are arranged in proximity to each other. The wireless LAN 20 further has the distal wireless LAN access points 20A, 20B, 20C, 20D, 20G, 20H. The distal wireless LAN access points 20A, 20B, 20C, 20D, 20G, 20H do not belong to the access point group 22.

It is noted that it can be determined based on the strength of received radio waves whether or not (the multiple proximal wireless LAN access points 20E, 20F are) "arranged in proximity to each other". For example, one of the proximal wireless LAN access points 20E (or 20F) receiving radio waves with a strength equal to or higher than a first strength threshold from the other proximal wireless LAN access point 20F (or 20E) is required to be "arranged in proximity to each other".

For example, the first strength threshold can be (strength of received radio waves)/(strength of radio waves at the transmitting end)=95%.

The controller 40 is connected to one of the wireless LAN access points 20A to 20H (the wireless LAN access point 20A in the example of FIG. 1) through the LAN cable 52

(and a switch not shown). The access point control device 10 is connected to the controller 40 through the LAN cable 54 (and a switch not shown).

The controller 40 is a well-known wireless LAN controller capable of acquiring information (e.g. the strength of radio waves that each of the wireless LAN access points 20A to 20H receives from the other wireless LAN access points) from the wireless LAN access points 20A to 20H. It is noted that the controller 40 acquires information via the wireless LAN access point 20A from the other wireless LAN access points 20B to 20H.

Note that "the strength of radio waves that each of the wireless LAN access points 20A to 20H receives from the other wireless LAN access points" means the strength of radio waves that the wireless LAN access point 20A receives from the other wireless LAN access points 20B to 20H, the strength of radio waves that the wireless LAN access point 20B receives from the other wireless LAN access points 20A, 20C to 20H, the strength of radio waves that the wireless LAN access point 20C receives from the other wireless LAN access points 20A, 20B, 20D to 20H, and the strength of radio waves that the wireless LAN access point 20H receives from the other wireless LAN access points 20A to 20G.

The access point control device 10 controls the proximal wireless LAN access points 20E, 20F via the controller 40 and the wireless LAN access point 20A.

Figure 2:
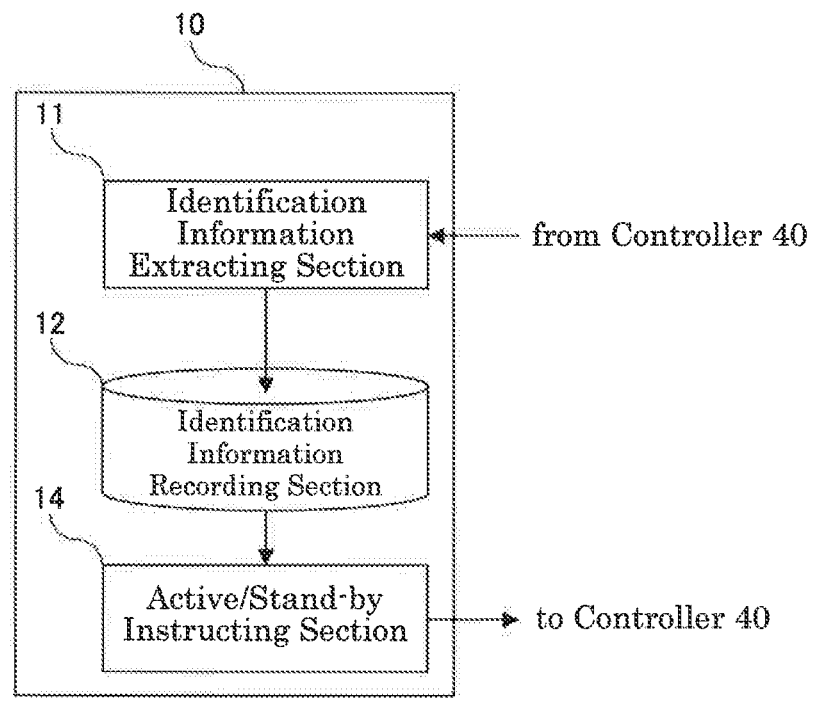
FIG. 2 is a functional block diagram showing the configuration of the access point control device 10 according to an embodiment.

FIG. 2 is a functional block diagram showing the configuration of the access point control device 10 according to an embodiment. The access point control device 10 according to an embodiment has an identification information extracting section 11, an identification information recording section 12, and an active/stand-by instructing section (terminal communication instructing section) 14.

The identification information extracting section 11 acquires information of the wireless LAN access points 20A to 20H from the controller 40 to extract identification information of the wireless LAN access points that serve as proximal wireless LAN access points. For example, the identification information extracting section 11 acquires from the controller 40 the strength of radio waves that each of the wireless LAN access points 20A to 20H receives from the other wireless LAN access points to extract identification information of the wireless LAN access points that receive radio waves with a strength equal to or higher than the first strength threshold (e.g. 95%). In the example of FIG. 1, the identification information extracting section 11 extracts identification information of the wireless LAN access points 20E, 20F.

The identification information recording section 12 receives from the identification information extracting section 11 and records identification information of the wireless LAN access points 20E, 20F that serve as proximal wireless LAN access points.

The active/stand-by instructing section (terminal communication instructing section) 14 instructs, based on records in the identification information recording section 12, any one or more of the proximal wireless LAN access points to be stand-by (stop communicating with the communication terminals 30a to 30d), while the proximal wireless LAN access points other than the proximal wireless LAN access points instructed to be stand-by to be active (communicate with the communication terminals 30a to 30d). The proximal wireless LAN access points instructed to be stand-by do not transmit/receive radio waves at the 5 GHz-band wireless communication interface that has been used to communicate with the communication terminals 30a to 30d.

Figure 3:
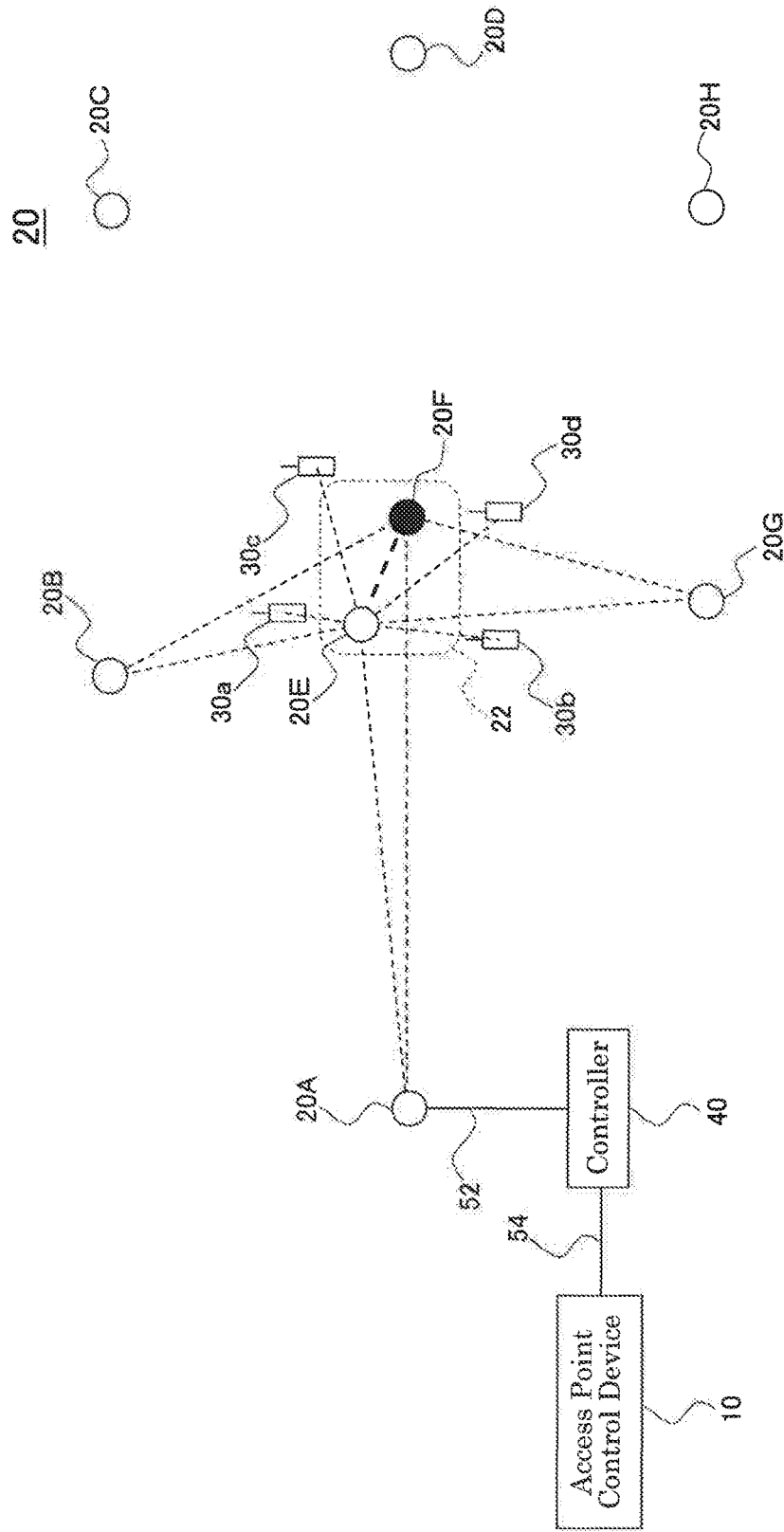
FIG. 3 shows active and stand-by states of the proximal wireless LAN access points 20E, 20F in the communication system according to an embodiment of the present disclosure.

FIG. 3 shows active and stand-by states of the proximal wireless LAN access points 20E, 20F in the communication system according to an embodiment of the present disclosure.

In the example of FIG. 3, the active/stand-by instructing section (terminal communication instructing section) 14 instructs, of the proximal wireless LAN access points 20E, 20F, via the controller 40 and the wireless LAN access point 20A, the proximal wireless LAN access point (stand-by proximal wireless LAN access point) 20F to be stand-by, while the proximal wireless LAN access point (active proximal wireless LAN access point) 20E to be active.

The stand-by proximal wireless LAN access point 20F serves as a mesh point in a mesh network. That is, the stand-by proximal wireless LAN access point 20F relay wireless communications between other wireless LAN access points (e.g. the wireless LAN access points 20B and 20G), but does not communicate wirelessly with the communication terminals 30c, 30d. As will be described below, the communication terminals 30c, 30d communicate wirelessly with the active proximal wireless LAN access point 20E instead of the stand-by proximal wireless LAN access point 20F. The stand-by proximal wireless LAN access point 20F waits for a chance to be active (any one of first to third active instruction conditions to be described in a second embodiment).

The active proximal wireless LAN access point 20E serves as a mesh access point in a mesh network not only to relay wireless communications between other wireless LAN access points (e.g. the wireless LAN access points 20B and 20G), but also communicate wirelessly with the communication terminals. That is, the active proximal wireless LAN access point 20E continuously communicates wirelessly with the communication terminals 30a, 30b, and additionally communicates wirelessly with the communication terminals 30c, 30d.

The proximal wireless LAN access points 20E, 20F thus communicate wirelessly with other wireless LAN access points (e.g. the wireless LAN access points 20B and 20G), regardless of whether or not stop communicating with the communication terminals 30a to 30d.

An operation according to an embodiment of the present disclosure will next be described.

The controller 40 first acquires, from each of the wireless LAN access points 20A to 20H via the wireless LAN access point 20A, the strength of radio waves that the wireless LAN access point receives from the other wireless LAN access points.

The identification information extracting section 11 of the access point control device 10 acquires from the controller 40 the strength of radio waves that each of the wireless LAN access points receives to extract identification information of the wireless LAN access points (the proximal wireless LAN access points 20E, 20F) that receive radio waves with a strength equal to or higher than the first strength threshold (e.g. 95%). The identification information recording section 12 records the results of extraction by the identification information extracting section 11.

The active/stand-by instructing section 14 instructs, based on records in the identification information recording section 12, any one of the proximal wireless LAN access points (the proximal wireless LAN access point 20F) to be stand-by, while the other proximal wireless LAN access point (the proximal wireless LAN access point 20E) to be active.

The instruction is transferred via the controller 40 and the wireless LAN access point 20A to the proximal wireless LAN access points 20E, 20F. The proximal wireless LAN access points 20E, 20F follow the instruction so that the proximal wireless LAN access point 20F becomes stand-by, while the proximal wireless LAN access point 20E becomes active.

The proximal wireless LAN access point 20E serves as a mesh access point in a mesh network (communicates wirelessly with the communication terminals 30a to 30d), while the proximal wireless LAN access point 20F serves as a mesh point (does not communicate wirelessly with the communication terminals 30a to 30d). Note that the proximal wireless LAN access points 20E and 20F in common communicate wirelessly with other wireless LAN access points (e.g. the wireless LAN access points 20B and 20G).

In order to eliminate coverage holes in the wireless LAN 20, too many wireless LAN access points may be arranged in proximity to each other (e.g. the proximal wireless LAN access points 20E, 20F). This often causes the channel used when the proximal wireless LAN access point 20E communicates wirelessly with the communication terminals 30a, 30b to be the same as the channel used when the proximal wireless LAN access point 20F communicates wirelessly with the communication terminals 30c, 30d (i.e. causes radio wave interference).

Hence, an embodiment of the present disclosure has an arrangement in which the stand-by proximal wireless LAN access point 20F does not communicate wirelessly with the communication terminals 30c, 30d, whereby no radio wave interference occurs between the proximal wireless LAN access point 20E and the proximal wireless LAN access point 20F. That is, in accordance with an embodiment of the present disclosure, it is possible to adjust and reduce the number of wireless LAN access points that communicate wirelessly with the communication terminals 30a to 30d to prevent radio wave interference.

It is noted that in the above-described embodiment, the proximal wireless LAN access point 20F instructed to be stand-by do not transmit/receive radio waves at the 5 GHz-band wireless communication interface that has been used to communicate with the communication terminals 30a to 30d. However, the 5 GHz-band wireless communication interface of the stand-by proximal wireless LAN access point 20F may be used for channel scanning in the wireless LAN 20 to acquire channel states (e.g. number of MAC addresses, number of packets, availability, and error packet rate for each channel) in the wireless LAN 20. The acquired channel states are provided to the controller 40.

Additional Extraction Conditions

In another embodiment, further conditions for extraction by the identification information extracting section 11 (second to fourth extraction conditions), that is, requirements to be met by the proximal wireless LAN access points 20E, 20F are added to the case (first extraction condition) in an embodiment. Another embodiment also describes the case where the stand-by proximal wireless LAN access point 20F is made active (first to third active instruction conditions).

Figure 4:
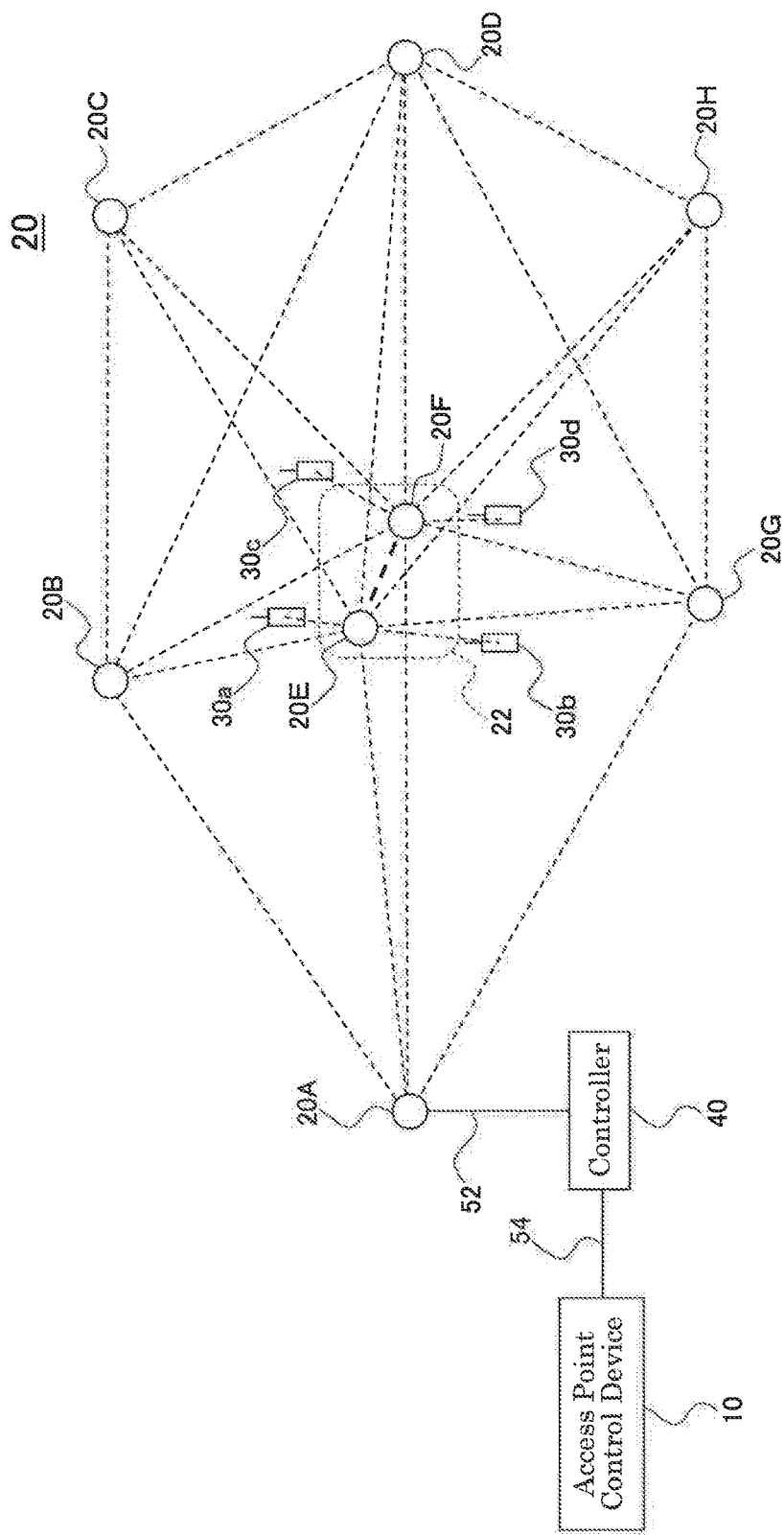
FIG. 4 shows the configuration of a communication system according to another embodiment of the present disclosure.

FIG. 4 shows the configuration of a communication system according to another embodiment of the present disclosure. The communication system according to another embodiment includes a wireless LAN 20, an access point control device 10, a controller 40, and LAN cables 52, 54. Components identical to those in an embodiment will hereinafter be designated by the same reference numerals to omit the description thereof.

The wireless LAN 20 is the same as described with reference to a previous embodiment. However, in FIG. 4, transmitting and receiving wireless LAN access points are connected with a thin broken line if the strength of radio waves that each of the wireless LAN access points 20A to 20H receives from the other wireless LAN access points is lower than the first strength threshold (e.g. 95%) but equal to or higher than the second strength threshold. It is noted that the second strength threshold is lower than the first strength threshold.

The second strength threshold can be, for example, (strength of received radio waves)/(strength of radio waves at the transmitting end)=20%. The value "20%" means the strength of radio waves required at the wireless LAN access point that receives radio waves when the receiving wireless LAN access point and the transmitting wireless LAN access point communicate wirelessly. The value "20%" may be defined as a specification of each wireless LAN access point.

It is noted that if the strength of radio waves that each of the wireless LAN access points 20A to 20H receives from the other wireless LAN access points is equal to or higher than the second strength threshold (e.g. 20%), the access points are considered to be "adjacent". For example, if the strength of radio waves that the wireless LAN access point 20A receives from the wireless LAN access point 20B is 50%, the wireless LAN access point 20A and the wireless LAN access point 20B are adjacent to each other.

In FIG. 4, adjacent ones of the wireless LAN access points 20A to 20H are connected with a thick or thin broken line.

It is noted that various thresholds are used in the second embodiment. FIG. 5 shows a list of thresholds used in the second embodiment. The first strength threshold and the second strength threshold have heretofore been described. A first number threshold (used in the second extraction condition), a second number threshold (used in the third extraction condition), a third number threshold (used in the third active instruction condition), and a difference threshold (used in the fourth extraction condition) will hereinafter be described.

The controller 40 is the same as described with reference to a previous embodiment. FIG. 6 shows an example of information of the wireless LAN access points 20A to 20H acquired by the controller 40 in another embodiment.

In FIG. 6, the wireless LAN access points 20A to 20H are abbreviated as "20A to 20H". Also, the controller 40 acquires information from the wireless LAN access points 20A to 20H at a receiving end. FIG. 6 shows the strength of radio waves that each of the wireless LAN access points 20A to 20H receives from the other wireless LAN access points. For example, referring to the field indicated by the row of the wireless LAN access point 20A as a receiving end and the column of the wireless LAN access point 20G as a transmitting end, the strength of radio waves that the wireless LAN access point 20A receives from the wireless LAN access point 20G is 70%. It is noted that if the strength of received radio waves is lower than the second strength threshold, no value is entered to remain blank.

The LAN cables 52, 54, together with switches not shown, connect the access point control device 10, the controller 40, and the wireless LAN access point 20A, as described with reference to a previous embodiment.

The configuration of the access point control device 10 is the same as described with reference to a previous embodiment (see FIG. 2), but further conditions for extraction by the identification information extracting section 11, that is, requirements to be met by the proximal wireless LAN access points 20E, 20F are added to the case described with reference to a previous embodiment. First to fourth conditions for extraction by the identification information extracting section 11 in another embodiment will hereinafter be described. The identification information extracting section 11 extracts identification information of wireless LAN access points that meet all of the first to fourth extraction conditions. That is, the proximal wireless LAN access points 20E, 20F should meet all of the first to fourth extraction conditions.

It is noted that the first extraction condition is only required to prevent radio wave interference. However, with only the first extraction condition, too many wireless LAN access points become stand-by (at least one for each access point group), which may pose an obstacle to communications using the communication terminals 30a to 30d. Hence, the second to fourth extraction conditions are added to reduce the number of stand-by wireless LAN access points not to pose an obstacle to communications using the communication terminals 30a to 30d.

First Extraction Condition

In a first extraction condition, radio waves with a strength equal to or higher than the first strength threshold are received.

The identification information extracting section 11 extracts identification information of wireless LAN access points that receive radio waves with a strength equal to or higher than the first strength threshold (e.g. 95%), which is the same as described with reference to a previous embodiment and will not be described in detail.

Referring to FIG. 6, wireless LAN access points that receive radio waves with a strength equal to or higher than the first strength threshold (e.g. 95%) are only the wireless LAN access point 20E (transmitted from the wireless LAN access point 20F) and the wireless LAN access point 20F (transmitted from the wireless LAN access point 20E).

Second Extraction Condition

In a second extraction condition, being adjacent to a first threshold number or more of wireless LAN access points.

The identification information extracting section 11 extracts identification information of wireless LAN access points that receive radio waves with a strength equal to or higher than the second strength threshold (e.g. 20%) among a first threshold number (e.g. three) or more of wireless LAN access points. That is, a wireless LAN access point is required to be adjacent to a first threshold number (e.g. three) or more of wireless LAN access points to be a proximal wireless LAN access point.

Any one or more of the proximal wireless LAN access points become stand-by as described with reference to a previous embodiment. Upon this, the communication terminals 30c, 30d, which have been communicating with the stand-by proximal wireless LAN access point 20F, will communicate wirelessly with the active proximal wireless LAN access point 20E. Here, if the active proximal wireless LAN access point 20E is adjacent to a certain number of wireless LAN access points, no obstacle is expected to be posed to communications using the mesh network. Accordingly, even if the communication terminals 30c, 30d may communicate wirelessly with the active proximal wireless LAN access point 20E instead of the stand-by proximal wireless LAN access point 20F, no obstacle is expected to be posed to communications using the wireless LAN 20.

Referring to FIG. 6, wireless LAN access points that receive radio waves with a strength equal to or higher than the second strength threshold (e.g. 20%) from a first threshold number (e.g. three) or more of wireless LAN access points are the wireless LAN access point 20A (four access points), the wireless LAN access point 20B (five), the wireless LAN access point 20C (four), the wireless LAN access point 20D (six), the wireless LAN access point 20E (seven), the wireless LAN access point 20F (seven), the wireless LAN access point 20G (five), and the wireless LAN access point 20H (four).

Third Extraction Condition

In a third extraction condition, each of two or more wireless LAN access points are adjacent to a second threshold number or more of common wireless LAN access points.

The identification information extracting section 11 extracts identification information of two or more wireless LAN access points that receive radio waves with a strength equal to or higher than the second strength threshold (e.g. 20%) among a second threshold number (e.g. three) or more of common wireless LAN access points. That is, a proximal wireless LAN access point is required to be adjacent to a second threshold number (e.g. three) or more of common wireless LAN access points. In this case, each of the two or more proximal wireless LAN access points receives radio waves with a strength equal to or higher than the second strength threshold from a second threshold number or more of common wireless LAN access points.

Any one or more of the proximal wireless LAN access points become stand-by as described with reference to a previous embodiment, while the others become active. In this case, the communication terminals 30c, 30d, which have been communicating with the stand-by proximal wireless LAN access point 20F, will communicate wirelessly with the active proximal wireless LAN access point 20E. Upon this, assume that the active proximal wireless LAN access point and the stand-by proximal wireless LAN access point are adjacent to a certain number of common wireless LAN access points. The communication terminals 30c, 30d are then expected to be capable of communicating with either the proximal wireless LAN access point 20E or the proximal wireless LAN access point 20F via a common wireless LAN access point using a mesh network. Accordingly, the overall wireless LAN 20 is made more likely to provide wireless communications with no trouble.

Referring to FIG. 6, two or more wireless LAN access points that receive radio waves with a strength equal to or higher than the second strength threshold (e.g. 20%) from a second threshold number (e.g. three) or more of common wireless LAN access points are, for example, the wireless LAN access points 20A and 20D (both adjacent to the wireless LAN access points 20B, 20E, 20F, 20G) and the wireless LAN access points 20E and 20F (both adjacent to the wireless LAN access points 20A to 20D, 20G, 20H).

Fourth Extraction Condition

In a fourth extraction condition, a difference in the strength of radio waves that each of two or more wireless LAN access points receives from common adjacent wireless LAN access points is equal to or lower than a predetermined difference threshold.

The identification information extracting section 11 extracts identification information of two or more wireless LAN access points that have a difference in the strength of radio waves received from common wireless LAN access points equal to or lower than a predetermined difference threshold (e.g. 10%) for any of the common wireless LAN access points. That is, a proximal wireless LAN access point is required to have a difference in the strength of radio waves received from common wireless LAN access points equal to or lower than a predetermined difference threshold for any of the common wireless LAN access points. In this case, the difference in the strength of radio waves that each of two or more proximal wireless LAN access points receives from common wireless LAN access points is equal to or lower than a predetermined difference threshold for any of the common wireless LAN access points.

Any one or more of the proximal wireless LAN access points become stand-by as described with reference to a previous embodiment, while the others become active. In this case, the communication terminals 30c, 30d, which have been communicating with the stand-by proximal wireless LAN access point 20F, will communicate wirelessly with the active proximal wireless LAN access point 20E. Under the third extraction condition, the communication terminals 30c, 30d are then expected to be capable of communicating with either the proximal wireless LAN access point 20E or the proximal wireless LAN access point 20F via a common wireless LAN access point using a mesh network. It is here not preferred that there is a large difference in the quality of communications of the common wireless LAN access point with the active proximal wireless LAN access point 20E and the stand-by proximal wireless LAN access point 20F. Accordingly, the difference in the communications quality is preferably equal to or lower than a predetermined difference threshold.

Referring to FIG. 6, two or more proximal wireless LAN access points that have a difference in the strength of radio waves received from common wireless LAN access points equal to or lower than a predetermined difference threshold for any of the common wireless LAN access points are only the wireless LAN access points 20E and 20F.

The wireless LAN access points other than 20E and 20F do not meet the fourth extraction condition. For example, both the wireless LAN access points 20A and 20D receive radio waves from the common wireless LAN access point 20E, but the strength is 60% (by the wireless LAN access point 20A) and 90% (by the wireless LAN access point 20D). This results in a difference in the reception strength 90%-60%=30%, which exceeds a difference threshold (e.g. 10%) and does not meet the fourth extraction condition.

What it comes down to is that since wireless LAN access points that meet all of the first to fourth extraction conditions are only the proximal wireless LAN access points 20E, 20F, the identification information extracting section 11 extracts identification information of the proximal wireless LAN access points 20E, 20F.

It is noted that in another embodiment, only the proximal wireless LAN access points 20E, 20F apply even under only the first extraction condition or all the first to fourth extraction conditions, but in general, the number of wireless LAN access points that apply is smaller under all the first to fourth extraction conditions than under only the first extraction condition.

It is noted that the active/stand-by instructing section 14 instructs, based on records in the identification information recording section 12, any one of the proximal wireless LAN access points (the proximal wireless LAN access point 20F) to be stand-by, while the other proximal wireless LAN access point (the proximal wireless LAN access point 20E) to be active, as described with reference to a previous embodiment.

Figure 7:
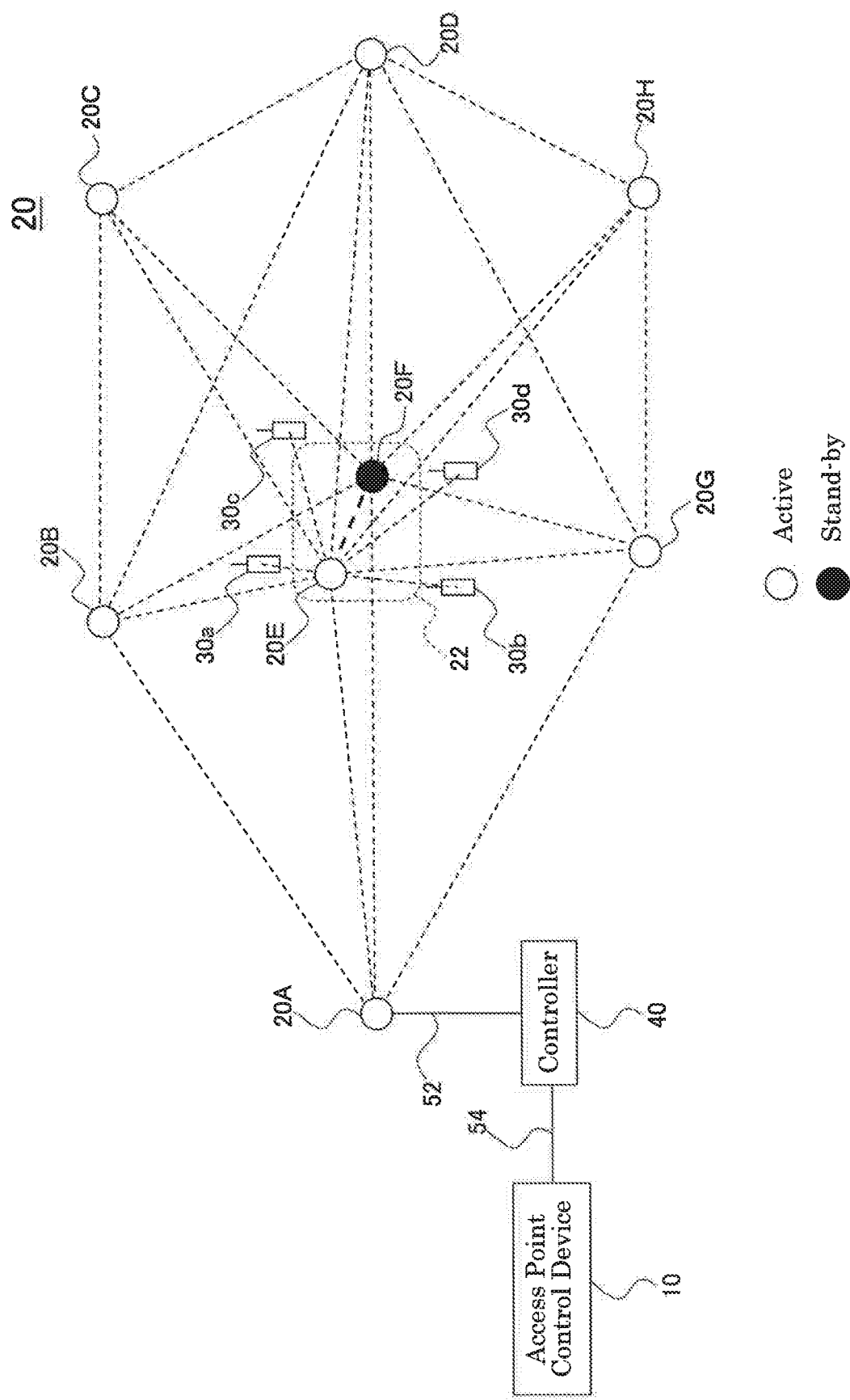
FIG. 7 shows active and stand-by states of the proximal wireless LAN access points 20E, 20F in the communication system according to another embodiment of the present disclosure.

FIG. 7 shows active and stand-by states of the proximal wireless LAN access points 20E, 20F in the communication system according to another embodiment of the present disclosure.

In the example of FIG. 7, the active/stand-by instructing section 14 instructs, of the proximal wireless LAN access points 20E, 20F, via the controller 40 and the wireless LAN access point 20A, the proximal wireless LAN access point (stand-by proximal wireless LAN access point) 20F to be stand-by, while the proximal wireless LAN access point (active proximal wireless LAN access point) 20E to be active.

The active proximal wireless LAN access point 20E serves as a mesh access point in a mesh network to relay wireless communications between other wireless LAN access points (e.g. the wireless LAN access points 20A, 20B, 20C, 20D, 20G, and 20H), and also communicate wirelessly with the communication terminals 30a to 30d.

The stand-by proximal wireless LAN access point 20F serves as a mesh point in a mesh network (as described with reference to a previous embodiment), and waits for a chance to be active.

It is noted that the active/stand-by instructing section 14 instructs the stand-by proximal wireless LAN access point 20F to be active. However, the active/stand-by instructing section 14 instructs the stand-by proximal wireless LAN access point 20F to be active only if any one of the following first to third active instruction conditions is met.

First Active Instruction Condition

In a first active instruction condition, the active proximal wireless LAN access point 20E undergoes a failure.

The active/stand-by instructing section 14 instructs the stand-by proximal wireless LAN access point 20F to be active if the active proximal wireless LAN access point 20E undergoes a failure.

Figure 8:
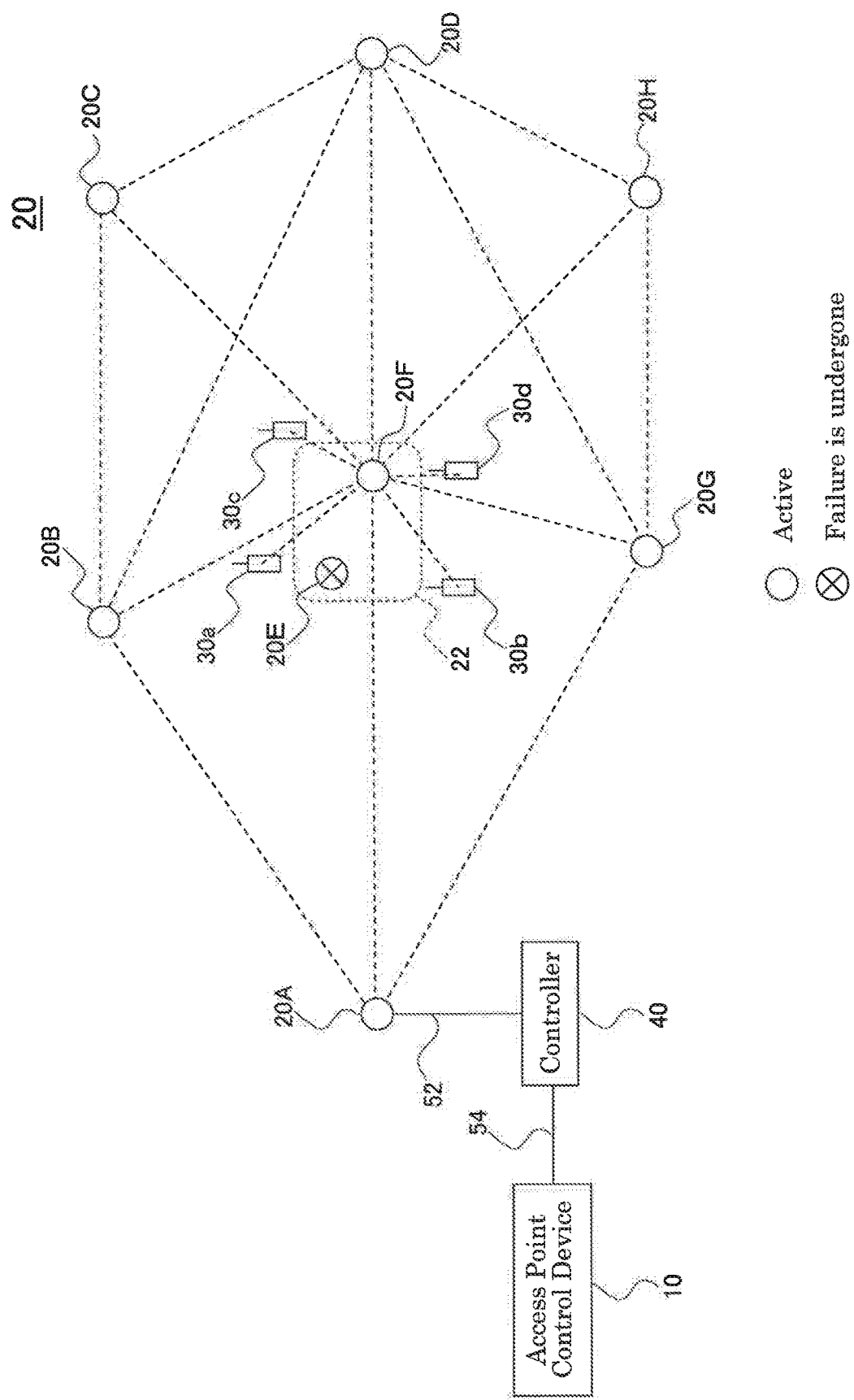
FIG. 8 shows a state where the active proximal wireless LAN access point 20E undergoes a failure in the communication system according to another embodiment of the present disclosure.

FIG. 8 shows a state where the active proximal wireless LAN access point 20E undergoes a failure in the communication system according to another embodiment of the present disclosure.

In the example of FIG. 8, the active/stand-by instructing section 14 detects that the active proximal wireless LAN access point 20E undergoes a failure via the controller 40 and the wireless LAN access point 20A. Further, the active/stand-by instructing section 14 instructs the stand-by proximal wireless LAN access point 20F to be active via the controller 40 and the wireless LAN access point 20A.

The stand-by proximal wireless LAN access point 20F then becomes active and serves as a mesh access point in a mesh network on behalf of the active proximal wireless LAN access point 20E to relay wireless communications between other wireless LAN access points (e.g. the wireless LAN access points 20A, 20B, 20C, 20D, 20G, and 20H) and communicate wirelessly with the communication terminals 30a to 30d.

Second Active Instruction Condition

In a second active instruction condition, the active proximal wireless LAN access point 20E can no longer receive (as before) radio waves with a strength equal to or higher than the second strength threshold from any one or more of the wireless LAN access points.

The active/stand-by instructing section 14 instructs the stand-by proximal wireless LAN access point 20F to be active if the active proximal wireless LAN access point 20E can no longer receive radio waves with a strength equal to or higher than the second strength threshold from any one or more of the wireless LAN access points (e.g. the wireless LAN access points 20B, 20C) that transmit radio waves with a strength equal to or higher than the second strength threshold (e.g. 20%) received by the active proximal wireless LAN access point 20E.

Figure 9:
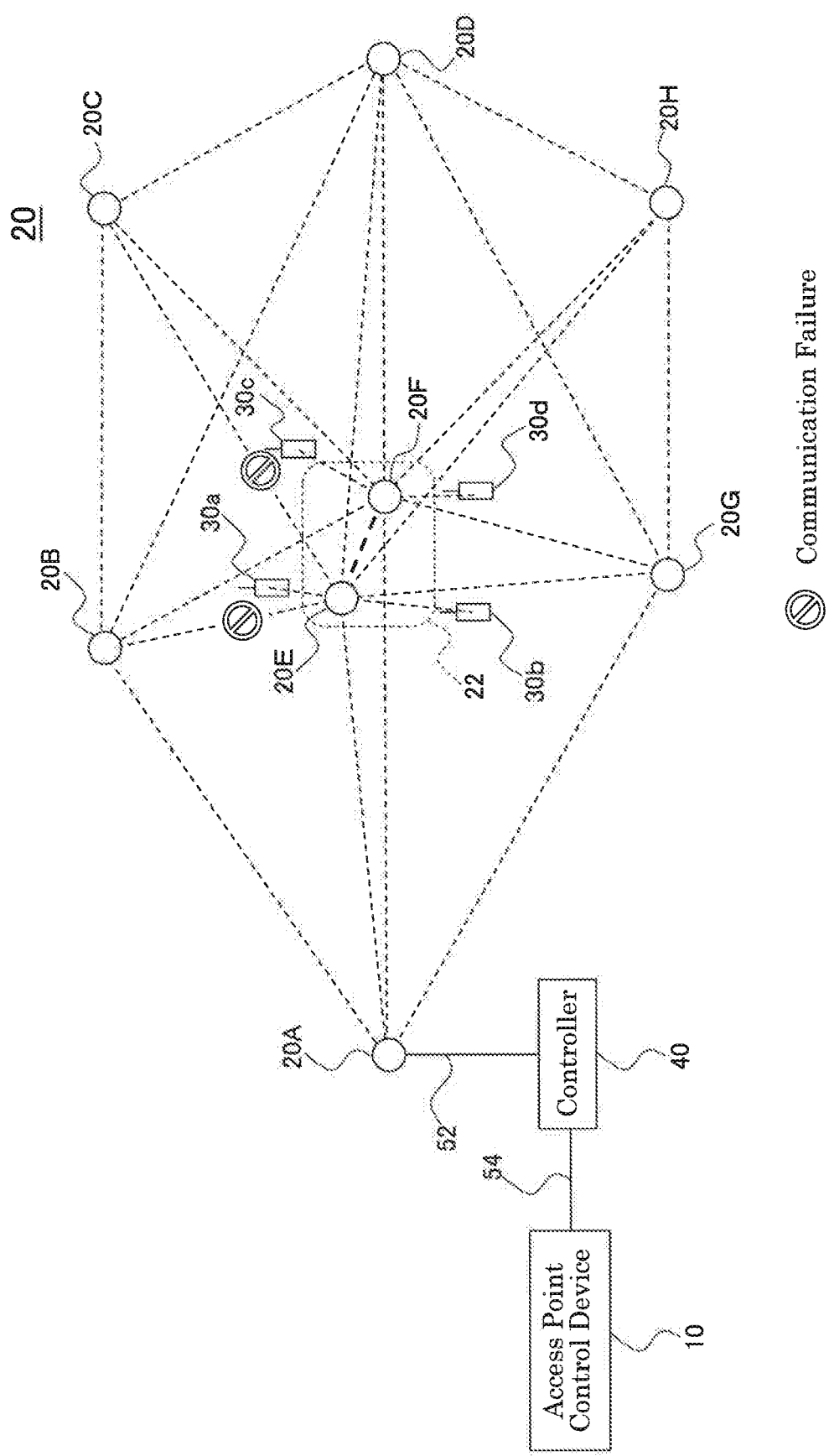
FIG. 9 shows a state where the active proximal wireless LAN access point 20E can no longer receive radio waves with a strength equal to or higher than the second strength threshold from the wireless LAN access points 20B, 20C in the communication system according to another embodiment of the present disclosure.

FIG. 9 shows a state where the active proximal wireless LAN access point 20E can no longer receive radio waves with a strength equal to or higher than the second strength threshold from the wireless LAN access points 20B, 20C in the communication system according to another embodiment of the present disclosure.

In the example of FIG. 9, the active/stand-by instructing section 14 detects that the active proximal wireless LAN access point 20E can no longer receive radio waves with a strength equal to or higher than the second strength threshold from the wireless LAN access points 20B, 20C via the controller 40 and the wireless LAN access point 20A. It should be noted that the active proximal wireless LAN access point 20E has received radio waves with a strength equal to or higher than the second strength threshold from the wireless LAN access points 20B, 20C (see FIGS. 6 and 7). This non-receivable state may be caused by, for example, a change in the radio environment such as construction or layout change in the office in which the wireless LAN 20 is arranged.

Further, the active/stand-by instructing section 14 instructs the stand-by proximal wireless LAN access point 20F to be active via the controller 40 and the wireless LAN access point 20A.

The stand-by proximal wireless LAN access point 20F then becomes active and serves as a mesh access point in a mesh network together with the active proximal wireless LAN access point 20E to communicate wirelessly with other wireless LAN access points (esp. the wireless LAN access points 20B and 20C). The wireless LAN access points 20B and 20C will communicate wirelessly with the stand-by proximal wireless LAN access point 20F instead of the active proximal wireless LAN access point 20E. It is noted that the proximal wireless LAN access point 20E communicates wirelessly with the communication terminals 30a, 30b and the proximal wireless LAN access point 20F communicates wirelessly with the communication terminals 30c, 30d.

Third Active Instruction Condition

In a third active instruction condition, the number of communication terminals that communicate with the active proximal wireless LAN access point 20E increase to be equal to or higher than a third number threshold (e.g. five).

The active/stand-by instructing section 14 instructs the stand-by proximal wireless LAN access point 20F to be active if the number of communication terminals that communicate with the active proximal wireless LAN access point 20E increases to be equal to or higher than a third number threshold (e.g. five).

Figure 10:
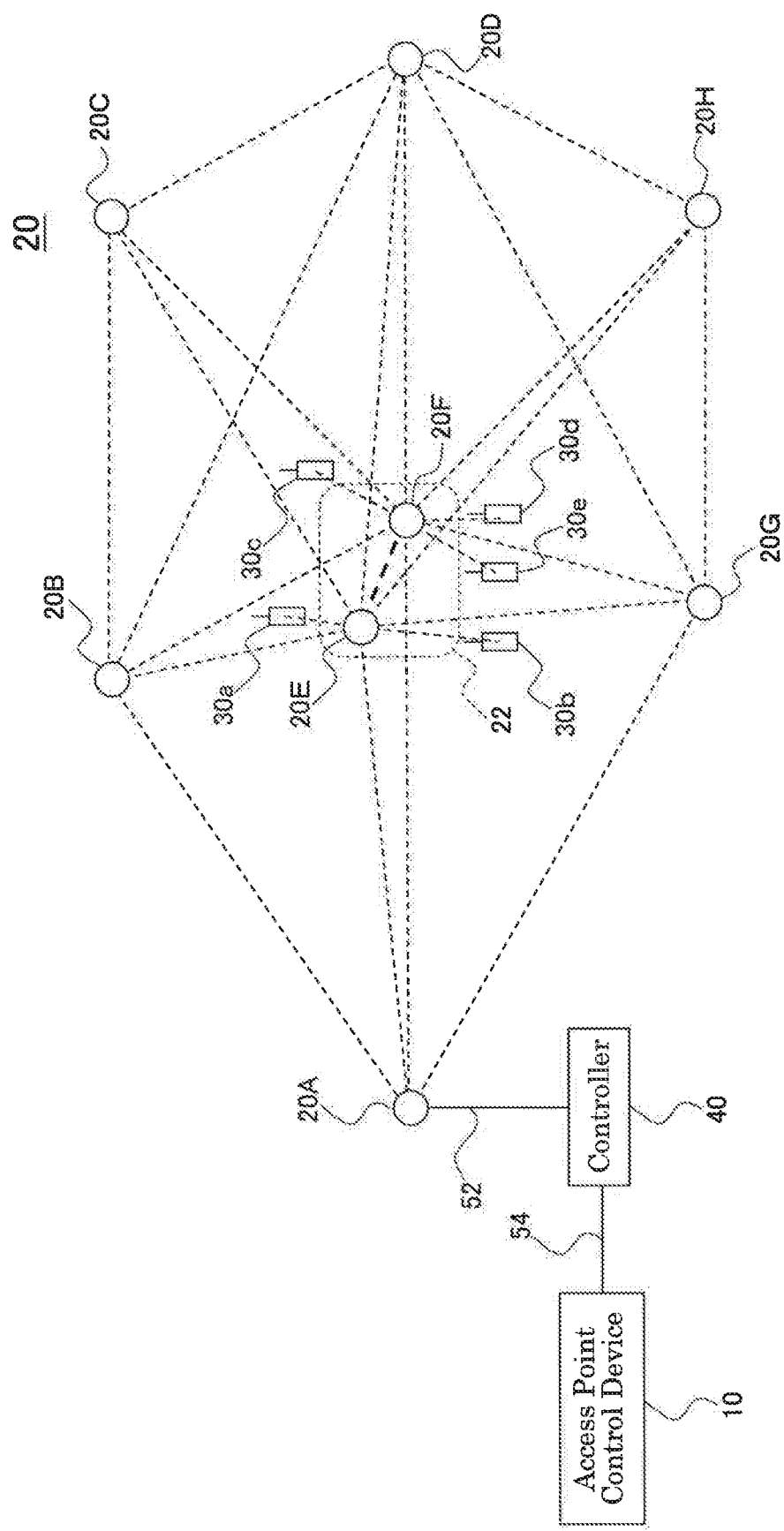
FIG. 10 shows a state where a new communication terminal 30e is arranged in the vicinity of the active proximal wireless LAN access point 20E in the communication system according to another embodiment of the present disclosure.

FIG. 10 shows a state where a new communication terminal 30e is arranged in the vicinity of the active proximal wireless LAN access point 20E in the communication system according to another embodiment of the present disclosure.

In the example of FIG. 10, the active/stand-by instructing section 14 detects that a new communication terminal 30e is arranged in the vicinity of the active proximal wireless LAN access point 20E and, as a result, the active proximal wireless LAN access point 20E communicates with the five communication terminals 30a to 30e via the controller 40 and the wireless LAN access point 20A. This causes the proximal wireless LAN access point 20E to be overloaded.

Further, the active/stand-by instructing section 14 instructs the stand-by proximal wireless LAN access point 20F to be active via the controller 40 and the wireless LAN access point 20A.

The stand-by proximal wireless LAN access point 20F then becomes active and serves as a mesh access point in a mesh network together with the active proximal wireless LAN access point 20E. For example, the proximal wireless LAN access point 20E communicates with the communication terminals 30a, 30b and the proximal wireless LAN access point 20F communicates with the communication terminals 30c, 30d, 30e. This can avoid the active proximal wireless LAN access point 20E being overloaded.

An operation according to another embodiment of the present disclosure will next be described.

The controller 40 first acquires, from each of the wireless LAN access points 20A to 20H via the wireless LAN access point 20A, the strength of radio waves that the wireless LAN access point receives from the other wireless LAN access points.

The identification information extracting section 11 of the access point control device 10 acquires from the controller 40 the strength of radio waves that each of the wireless LAN access points receives to extract identification information of the wireless LAN access points (the proximal wireless LAN access points 20E, 20F) that meet all the first to fourth extraction conditions. The identification information recording section 12 records the results of extraction by the identification information extracting section 11.

The active/stand-by instructing section 14 instructs, based on records in the identification information recording section 12, any one of the proximal wireless LAN access points (the proximal wireless LAN access point 20F) to be stand-by, while the other proximal wireless LAN access point (the proximal wireless LAN access point 20E) to be active.

The instruction is transferred via the controller 40 and the wireless LAN access point 20A to the proximal wireless LAN access points 20E, 20F. The proximal wireless LAN access points 20E, 20F follow the instruction so that the proximal wireless LAN access point 20F becomes stand-by, while the proximal wireless LAN access point 20E becomes active.

The proximal wireless LAN access point 20E serves as a mesh access point in a mesh network (e.g. relays wireless communications between, for example, the wireless LAN access points 20B and 20G and communicates wirelessly with the communication terminals 30a to 30d), while the proximal wireless LAN access point 20F becomes stand-by (serves as a mesh point to, for example, relay wireless communications between, for example, the wireless LAN access points 20B and 20G, but does not communicate wirelessly with the communication terminals 30a to 30d).

Subsequently, when any one of the first to third active instruction conditions is met due to, for example, a change in the radio environment, the active/stand-by instructing section 14 instructs the stand-by proximal wireless LAN access point 20F to be active via the controller 40 and the wireless LAN access point 20A.

In accordance with another embodiment of the present disclosure, since the second to fourth extraction conditions are added to the first extraction condition, the number of wireless LAN access points to be stand-by can be reduced compared to an embodiment. This allows the number of wireless LAN access points that communicate wirelessly with, for example, the communication terminal 30a to be adjusted to increase, compared to an embodiment, and thereby no obstacle to communications using, for example, the communication terminal 30a to be posed.

Further, in accordance with another embodiment of the present disclosure, if any one of the first to third active instruction conditions is met, the stand-by proximal wireless LAN access point 20F becomes active, whereby a change in the radio environment, for example, can be accommodated.

It is noted that the access point control device 10 and the controller 40 may be integrated, though separated in the first and second embodiments.

The above-described embodiments can also be achieved as follows. A medium (e.g. floppy (registered trademark)

disk, CD-ROM) with a program recorded therein that implements the above-described sections (e.g. each section of the access point control device 10) is read by a computer including a CPU, a hard disk, and a medium reader and installed in the hard disk. The above-described functions can be achieved, for example, in this manner.

I claim as follows:

1. An access point control device that controls a plurality of proximal wireless LAN access points arranged in proximity to each other and communicating with a communication terminal in a wireless LAN having an access point group of the proximal wireless LAN access points, the access point control device comprising:
   an identification information recording section that records identification information of the proximal wireless LAN access points; and
   a terminal communication instructing section that, based on records in the identification information recording section, instructs one or more of the proximal wireless LAN access points to stop communicating with the communication terminal and instructs the proximal wireless LAN access points other than the proximal wireless LAN access points instructed to stop communicating with the communication terminal to communicate with the communication terminal, wherein
   the proximal wireless LAN access points instructed to stop communicating with the communication terminal, continue to communicate with other wireless LAN access points belonging to the wireless LAN regardless.

2. The access point control device according to claim 1, wherein
   the wireless LAN conforms to IEEE Standard 802.11s.

3. The access point control device according to claim 1, wherein one of the proximal wireless LAN access points receives radio waves with a strength equal to or higher than a first strength threshold from the other proximal wireless LAN access points.

4. The access point control device according to claim 1, wherein the terminal communication instructing section instructs stand-by proximal wireless LAN access points, which are the proximal wireless LAN access points instructed by the terminal communication instructing section to stop communicating with the communication terminal, to communicate with the communication terminal.

5. The access point control device according to claim 4, wherein the terminal communication instructing section instructs the stand-by proximal wireless LAN access points to be active when
   (1) active proximal wireless LAN access points, which are the proximal wireless LAN access points instructed by the terminal communication instructing section to communicate with the communication terminal, undergo a failure, or
   (2) the active proximal wireless LAN access points cannot receive radio waves with a strength equal to or higher than a second strength threshold from any one or more of the wireless LAN access points that transmit radio waves with a strength equal to or higher than the second strength threshold received by the active proximal wireless LAN access points, or
   (3) a third threshold number or more increased of communication terminals communicate with the active proximal wireless LAN access points.

6. The access point control device according to claim 1, wherein the proximal wireless LAN access points instructed to stop communicating with the communication terminal acquire channel states in the wireless LAN.

7. An access point control device that controls a plurality of proximal wireless LAN access points arranged in proximity to each other and communicating with a communication terminal in a wireless LAN having an access point group of the proximal wireless LAN access points, wherein
   the wireless LAN has a distal wireless LAN access point not belonging to the access point group,
   both the proximal wireless LAN access points and the distal wireless LAN access point are wireless LAN access points,
   the proximal wireless LAN access points receive radio waves with a strength equal to or higher than a second strength threshold that is lower than a first strength threshold from a first threshold number or more of the wireless LAN access points,
   two or more of the proximal wireless LAN access points each receive radio waves with a strength equal to or higher than the second strength threshold from a common second threshold number or more of the wireless LAN access points, and
   a difference in a strength of radio waves that the two or more of the proximal wireless LAN access points each receive from common wireless LAN access points is equal to or lower than a predetermined difference threshold for any of the common wireless LAN access points the access point control device comprising:
   an identification information recording section that records identification information of the proximal wireless LAN access points; and
   a terminal communication instructing section that, based on records in the identification information recording section, instructs one or more of the proximal wireless LAN access points to stop communicating with the communication terminal and instructs the proximal wireless LAN access points other than the proximal wireless LAN access points instructed to stop communicating with the communication terminal to communicate with the communication terminal.

8. The access point control device according to claim 7, wherein the terminal communication instructing section instructs stand-by proximal wireless LAN access points, which are the proximal wireless LAN access points instructed by the terminal communication instructing section to stop communicating with the communication terminal, to communicate with the communication terminal.

9. The access point control device according to claim 8, wherein the terminal communication instructing section instructs the stand-by proximal wireless LAN access points to be active when
   (1) active proximal wireless LAN access points, which are the proximal wireless LAN access points instructed by the terminal communication instructing section to communicate with the communication terminal, undergo a failure, or
   (2) the active proximal wireless LAN access points cannot receive radio waves with a strength equal to or higher than a second strength threshold from any one or more of the wireless LAN access points that transmit radio waves with a strength equal to or higher than the second strength threshold received by the active proximal wireless LAN access points, or
   (3) a third threshold number or more increased of communication terminals communicate with the active proximal wireless LAN access points.

10. The access point control device according to claim 7, wherein the proximal wireless LAN access points instructed to stop communicating with the communication terminal acquire channel states in the wireless LAN.

11. An access point control method of controlling a plurality of proximal wireless LAN access points arranged in proximity to each other and communicating with a communication terminal in a wireless LAN having an access point group of the proximal wireless LAN access points, the access point control method comprising:
- an identification information recording step that records identification information of the proximal wireless LAN access points; and
- a terminal communication instructing step that, based on records in the identification information recording step, instructs one or more of the proximal wireless LAN access points to stop communicating with the communication terminal and instructs the proximal wireless LAN access points other than the proximal wireless LAN access points instructed to stop communicating with the communication terminal to communicate with the communication terminal, wherein the proximal wireless LAN access points instructed to stop communicating with the communication terminal, continue to communicate with other wireless LAN access points belonging to the wireless LAN regardless.

12. The access point control method according to claim 11, wherein the proximal wireless LAN access points instructed to stop communicating with the communication terminal acquire channel states in the wireless LAN.

13. A non-transitory computer readable medium storing instructs for controlling a plurality of proximal wireless LAN access points arranged in proximity to each other and communicating with a communication terminal in a wireless LAN having an access point group of the proximal wireless LAN access points, which instructions when executed by a processor perform an access point control method comprising:
- recording identification information of the proximal wireless LAN access points; and
- based on the identification information recorded, instructing one or more of the proximal wireless LAN access points to stop communicating with the communication terminal and instructs the proximal wireless LAN access points other than the proximal wireless LAN access points instructed to stop communicating with the communication terminal to communicate with the communication terminal, wherein the proximal wireless LAN access points instructed to stop communicating with the communication terminal, continue to communicate with other wireless LAN access points belonging to the wireless LAN regardless.

14. The non-transitory computer readable medium according to claim 13, wherein the proximal wireless LAN access points instructed to stop communicating with the communication terminal acquire channel states in the wireless LAN.

* * * * *